(12) United States Patent
Nakanishi (10) Patent No.: US 8,542,959 B2
(45) Date of Patent: Sep. 24, 2013

(54) OPTICAL DEVICE INCLUDING AN ALIGNMENT SUBSTRATE

(75) Inventor: Hiromi Nakanishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 216 days.

(21) Appl. No.: 13/179,803

(22) Filed: Jul. 11, 2011

(65) Prior Publication Data

US 2012/0020611 A1    Jan. 26, 2012

(30) Foreign Application Priority Data

Jul. 21, 2010    (JP) ................. 2010-164075

(51) Int. Cl.
  *G02B 6/00*    (2006.01)
  *G02B 6/122*    (2006.01)
(52) U.S. Cl.
  USPC .......................................... 385/14

(58) Field of Classification Search
  USPC .............. 385/14–16, 88–92, 139–147
  See application file for complete search history.

(56) References Cited

U.S. PATENT DOCUMENTS

| 5,548,673 | A | * | 8/1996 | Kitamura et al. | ............... 385/49 |
| 6,814,504 | B2 | * | 11/2004 | Nakanishi et al. | ............... 385/92 |
| 2005/0238278 | A1 | * | 10/2005 | Nakashiba et al. | ............. 385/14 |

FOREIGN PATENT DOCUMENTS

JP    2004-273620 A    9/2004
JP    2007-041342 A    2/2007

* cited by examiner

*Primary Examiner* — Akm Enayet Ullah
(74) *Attorney, Agent, or Firm* — Global IP Counselors, LLP (57) ABSTRACT

An optical device that emits white light by mixing three or four light each having a specific color is disclosed. The optical device includes the alignment substrate having a first type of grooves each setting an optical fiber therein and a second type of a groove setting all fibers collectively. Between two type of grooves, all fibers are free from grooves to facilitate the assemble of the fibers.

12 Claims, 14 Drawing Sheets

OPTICAL DEVICE INCLUDING AN ALIGNMENT SUBSTRATE

BACKGROUND OF THE INVENTION

1. Field of the Invention

The present invention relates to a semiconductor optical device.

2. Related Prior Arts

Various prior patent applications have disclosed a technology that a plural optical source each generating light with a specific wavelength different from others is concentrated on a single fiber to generate white light. For instance, a Japanese Patent Application published as JP-2004-273620 has disclosed an optical device that includes a plurality of semiconductor laser diodes (hereafter denoted as LD), a lens array having a plurality of collimator lenses, a condenser lens, and an optical fiber. Each of collimator lenses collimates light emitted from an LD. The condenser lens condenses the collimated light to the optical fiber.

Another Japanese Patent Application published as JP-2007-041342 has disclosed another type of an optical device that comprises a plurality of optical sources and a plurality of optical fibers each corresponding to one of the optical sources. The optical fibers in a core thereof are unified at one end opposite to the side facing the optical source. However, such prior technologies inherently have subjects of increased alignment procedures and uneven mixture of optical beams.

SUMMARY OF THE INVENTION

One aspect of the present invention relates to an optical device that emits white light. The optical device of the invention includes a plurality of LDs, a plurality of fivers, and a substrate. Each of LDs emits light with a specific color. Each of fibers individually propagates the light emitted from one of LDs corresponding to the fiber. The substrate includes a first type of grooves and a second type of a groove. Each of the first type of grooves individually sets one of fibers therein. The second type of the groove collectively sets all fibers therein. A feature of the present invention is that the substrate has a hollow between the first type of grooves and the second type of the groove. The fibers can wiggle in the hollow.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS

Next, some preferred embodiments according to the present invention will be described as referring to accompanying drawings. In the description of the drawings, the same numeral or symbol will refer to the same element without overlapping explanations.

Figure 1:
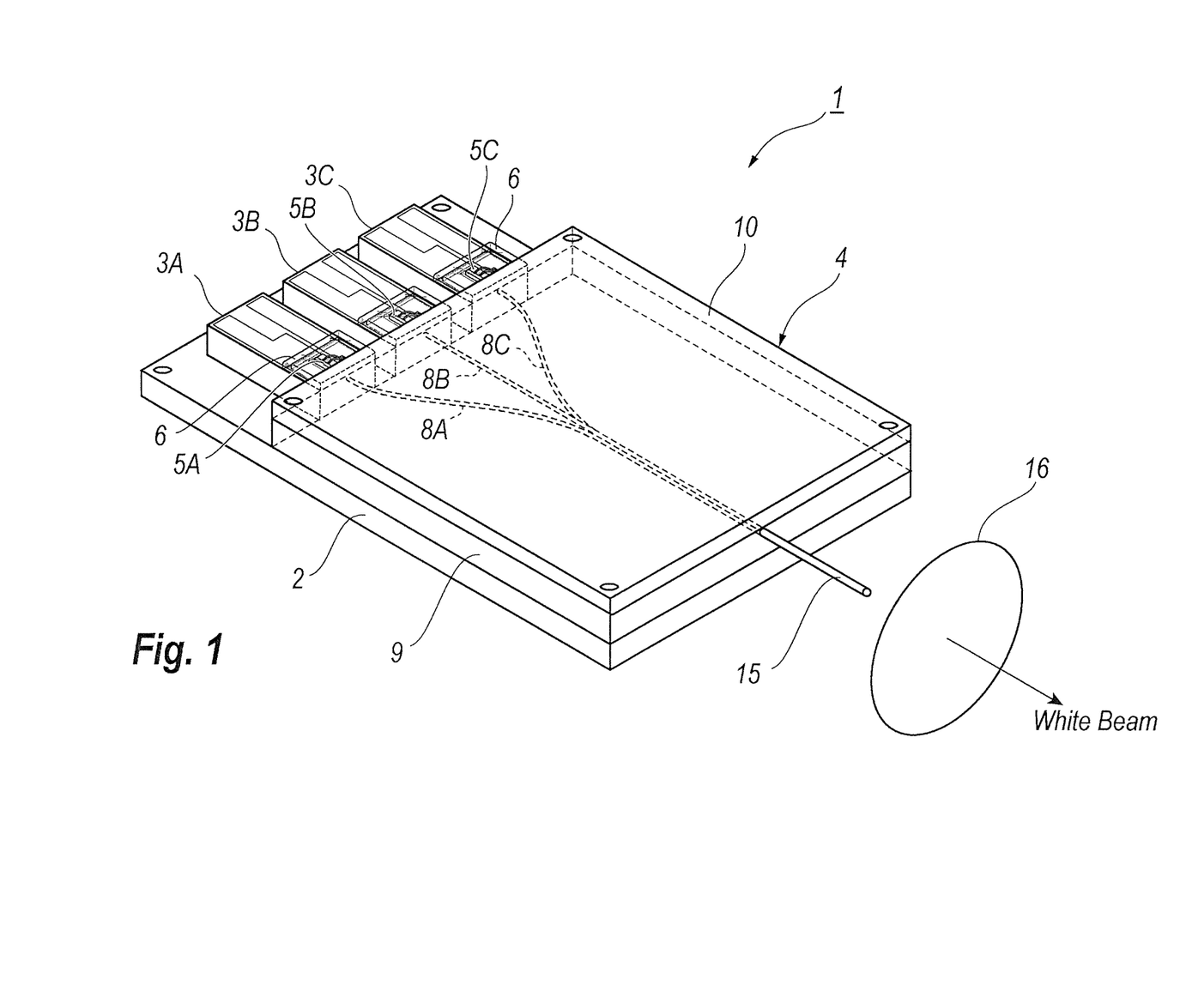
FIG. 1 is a perspective view of an optical device according to an embodiment of the present invention.
Figure 2:
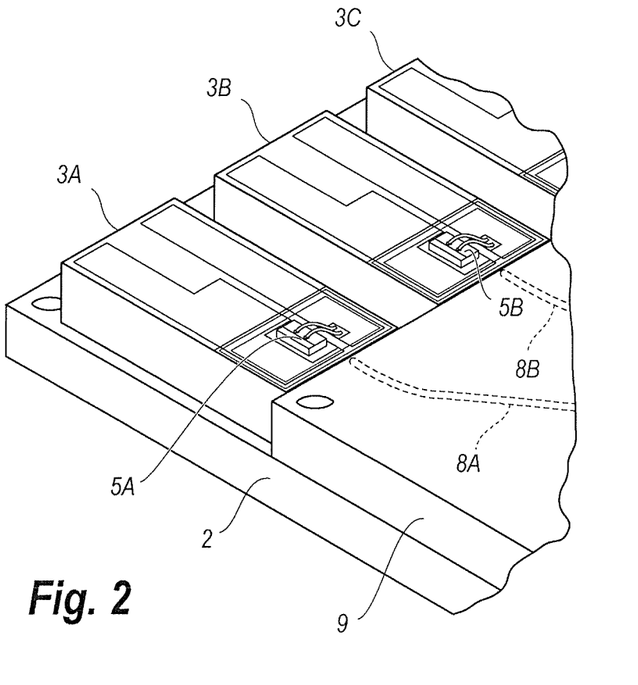
FIG. 2 magnifies a portion where the LD is mounted on a sub-mount, and the sub-mount is mounted on the base.

FIG. 1 is a perspective view showing an optical device according to the first embodiment of the present invention. The optical device 1, as shown in FIG. 1, includes a base 2, sub-mounts 3A to 3C where they are mounted on the base 2 and have a rectangular shape, and a holder 4 where it is also mounted on the base 2 in adjacent to the sub-mounts, 3A to 3C, for supporting optical fibers, 8A to 8C and 15.

The base 2 may be made of metal, typically an aluminum alloy or a magnesium alloy. In alternatives, copper and copper alloy, or a material with copper cladding, where those materials show relatively greater thermal conductivity, are also applicable to the base 2 when the optical device 1 is necessary to dissipate heat efficiently.

The sub-mounts, 3A to 3C, each install an LD, 5A to 5C, that emits light with a specific wavelength different from the others. For instance, the LD 5A emits blue light, a center wavelength of which is about 460 nm. The second LD 5B emits green light with a center wavelength of around 535 nm, and the third LD 5C may emit red light with a center wavelength of about 630 nm.

The sub-mounts, 3A to 3C, may be made of aluminum nitride (AlN), silicon carbide (SiC), silicon (Si), copper tungsten (CuW), copper molybdenum (CuMo), and so on because of the thermal expansion coefficient thereof comparable to that of the LD, 5A to 5C. However, the sub-mounts, 3A to 3C, may be made of other materials depending on the operating conditions and the lifetime of the LD, 5A to 5C. The sub-mounts, 3A to 3C, may have dimensions of $4.0 \times 2.5 \times 1.0$ mm$^3$.

Figure 3A:
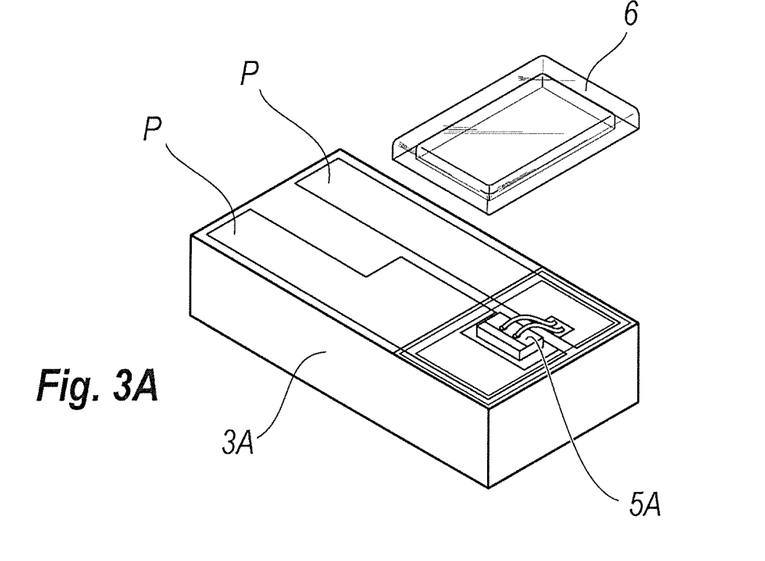
FIGS. 3A and 3B show processes to assemble an LD on the sub-mount, and to assemble a cover above the LD, respectively.
Figure 3B:
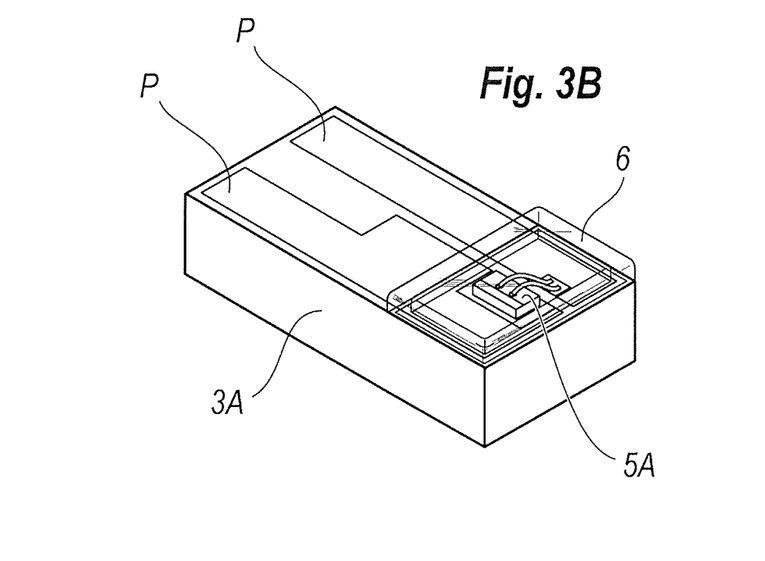

The LDs, 5A to 5C, may be mounted on a surface in respective sub-mounts, 3A to 3C, by an electrically conductive resin which is typically gold tin (AuSn), silver tin (AgSn), or silver (Ag) and so on. A cap 6 may hermetically seal the LDs, 5A to 5C. In an alternative, a resin may encapsulate the LDs, 5A to 5C. FIGS. 3A and 3B show processes to seal the LD 5A on the sub-mount 3A with a cap 6.

The surface of the sub-mounts, 3A to 3C, on which the LD, 5A to 5C, is mounted, has an interconnection P. The back surface of the sub-mounts, 3A to 3C, may also have an interconnection. Moreover, the sub-mounts, 3A to 3C, may further mount a photodiode (hereafter denoted as PD) to monitor an emission of the LD, 5A to 5C.

Figure 4:
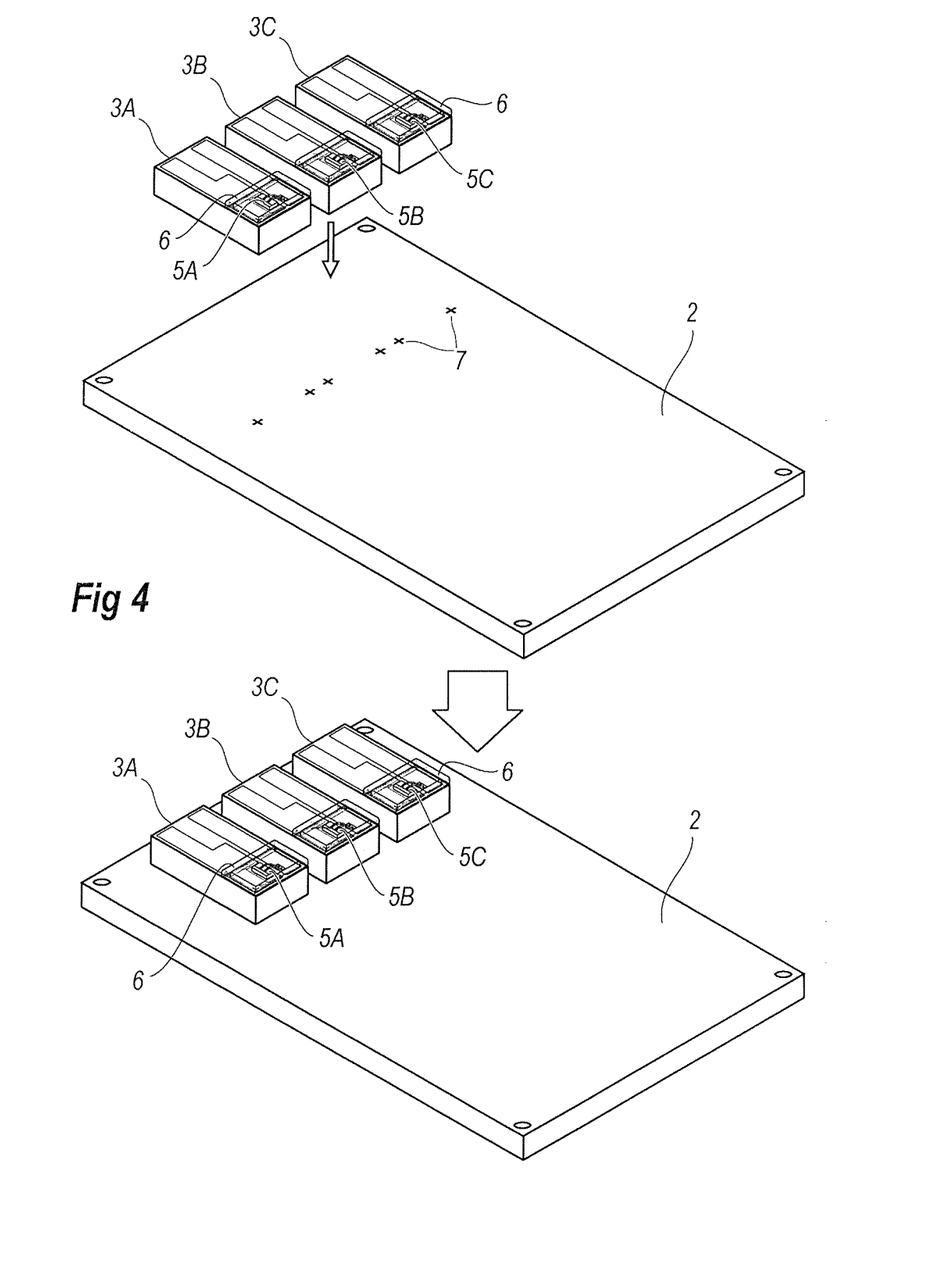
FIG. 4 show a process to mount a plurality of sub-mounts on the base as using alignment marks prepared on the surface of the base.

The sub-mounts, 3A to 3C, each installing the LD, 5A to 5C, thereon may be mounted on the base 2 after preset investigations of the LDs, 5A to 5C. The base 2 installs such sub-mounts, 3A to 3C, thereon with a space of 3.0 mm against the neighbor sub-mount. The top surface of the base 2 may prepare alignment marks 7 with an L-character and/or a cross-character to facilitate the installation of the sub-mounts, 3A to 3C, and to secure the optical coupling of the LDs, 5A to 5C, with corresponding fibers, 8A to 8C, which is shown in FIG. 4. Details of the installation of the sub-mounts, 3A to 3C, will be described later. In the present embodiment, the alignment mark 7 with the cross-character has a length of about 0.5 mm and a line width thereof about 0.02 mm.

Referring back to FIG. 1 again, the holder 4 may support the fibers, 8A to 8C, each optically coupled with the corresponding LD, 5A to 5C. The fibers, 8A to 8C, may be a type of the glass fiber or the plastic optical fiber. A thinner cladding is available for the glass fiber, which may shrink the beam size of the light after the mixture; while, an enhanced resistance for flaws is available in the plastic optical fiber, which improves the reliability of the device 1.

The optical fibers, 8A to 8C, preferably fit the aperture (NA) thereof to the field pattern of the LDs, 5A to 5C, because the present optical device does not provide any condensing lenses between the LD and the optical fiber. Setting the aperture NA of the optical fibers, 8A to 8C, to be 0.2, light with a traveling direction less than 8.1° with respect to the optical axis of the fibers, 8A to 8C, may propagate within the fibers by total internal reflection.

The optical fibers, 8A to 8C, are preferably selected depending on the alignment accuracy of the LDs, 5A to 5C, that of the sub-mounts, 3A to 3C, and so on to enhance the optical coupling efficiency. For instance, when the alignment accuracy of the LDs, 5A to 5C, against the sub-mounts, 3A to 3C, is 20 μm at most and that of the sub-mounts, 3A to 3C, against the base 2 is 10 μm at most; the fibers, 8A to 8C, preferably have a core diameter of 74 μm and a cladding diameter of 80 μm; because such fibers may optically couple with respective LDs, 5A to 5C efficiently even when the alignment accuracy of the LD, 5A to 5C, against the base 2 ranges 30 μm.

The holder 4 includes an alignment substrate 9 and a cover 10. The alignment substrate 9 may align the optical fibers, 8A to 8C, while, the cover 10 may cover the optical fibers, 8A to 8C, by abutting them against the alignment substrate 9.

Figure 5:
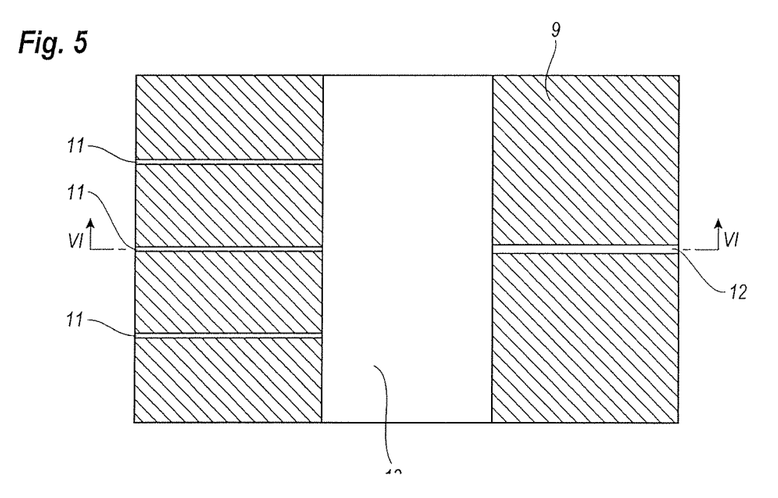
FIG. 5 is a plan view of the alignment substrate shown in FIG. 1.
Figure 6:
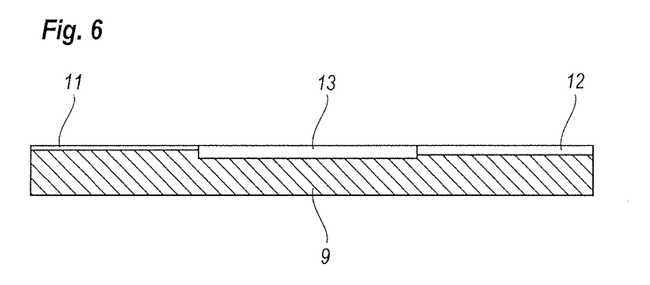
FIG. 6 is a cross section of the alignment substrate taken along the line VI-VI.
Figure 7:
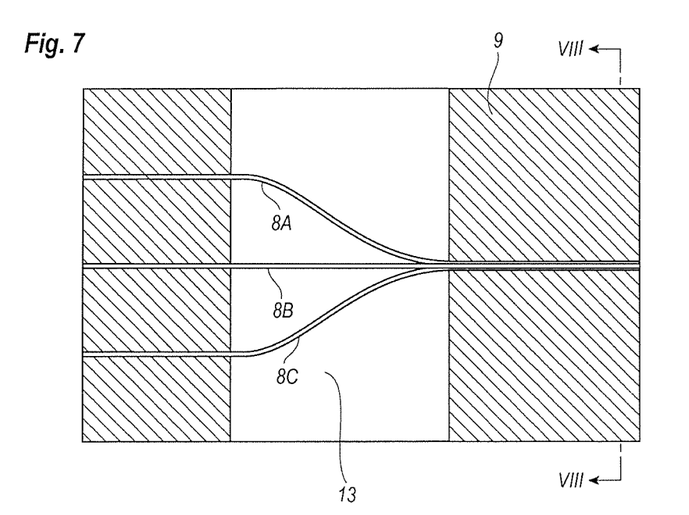
FIG. 7 is a plan view of the alignment substrate where respective grooves set fivers individually and collectively therein.

As shown in FIGS. 5 to 7, the alignment substrate 9 has grooves 11 with a space of 3 mm in a side facing the sub-mounts, 3A to 3C, into which respective optical fibers, 8A to 8C, are individually set. The groove 11 will be called as the first type of the grooves. The groove 11 has a square cross section. The alignment substrate 9 has another groove 12 in a side opposite to the side facing LDs, into which all fibers, 8A to 8C, are collectively set. The groove 12 will be called as the second type of the groove. The other groove 12 also has a square cross section. Moreover, the alignment substrate 9 includes a hollow 13 between two sides above described, or between two types of the grooves, 11 and 12. The hollow 13 has a depth greater than a depth of the respective grooves, 11 and 12. The optical fibers, 8A to 8C, are set in respective grooves, 11 and 12, as bending them in the hollow 13 so as to absorb their surplus lengths. In other words, the optical fibers, 8A to 8C, are unrestrained within the hollow 13 and are able to move or wiggle, as needed or desired, in the hollow 13. Dicing and other conventional techniques may easily form the grooves, 11 and 12, and the hollow 13.

When the optical device 1 installs the fibers whose core diameter and cladding diameter are 74 μm and 80 μm, respectively; the groove 11 preferably has a width of 82 to 87 μm and a length of 1 mm or more for fixing the fibers therein.

Figure 8:
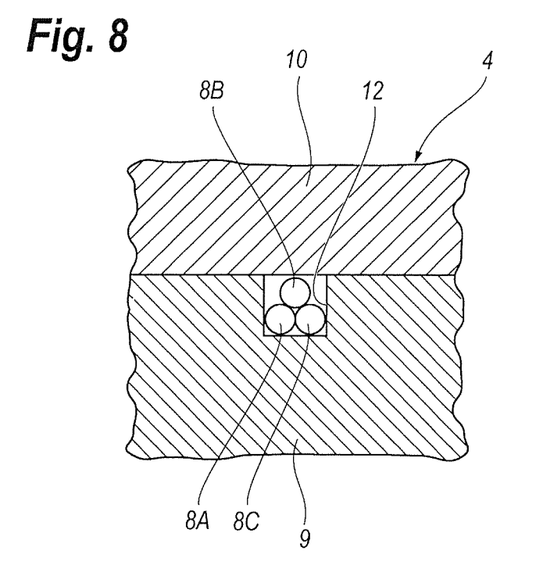
FIG. 8 is a cross section of the groove into which fibers are collectively set therein.

While, the other groove 12, as shown in FIG. 8, collectively sets the optical fibers, 8A to 8C, therein so as to come claddings thereof in directly contact to the others, which may minimize a diameter of a virtual circle enveloping all optical fibers. The depth of the groove 12 may become about 149.3 μm by a sum of a height of a triangle connecting the center of respective fibers and the cladding diameter when the optical fibers, 8A to 8C, above described having the core and cladding diameters of 74 and 80 μm, respectively, are used. The groove 12 also preferably has a length greater than 1 mm to fix the optical fibers therein securely.

Thus, collecting the optical fibers, 8A to 8C, so as to come their claddings in contact to the others, the light emitted from respective LDs, 5A to 5C, and propagating in optical fibers, 8A to 8C, may be easily mixed at the exit of the fibers, 8A to 8C. The alignment substrate 9 may have dimensions of $20 \times 12 \times 1$ mm$^3$; while, the cover 10 has a dimension substantially equal to that of the alignment substrate 9. The alignment substrate 9 may be also formed by glass-forming, resin-molding and so on, except for the dicing described above.

Figure 9A:
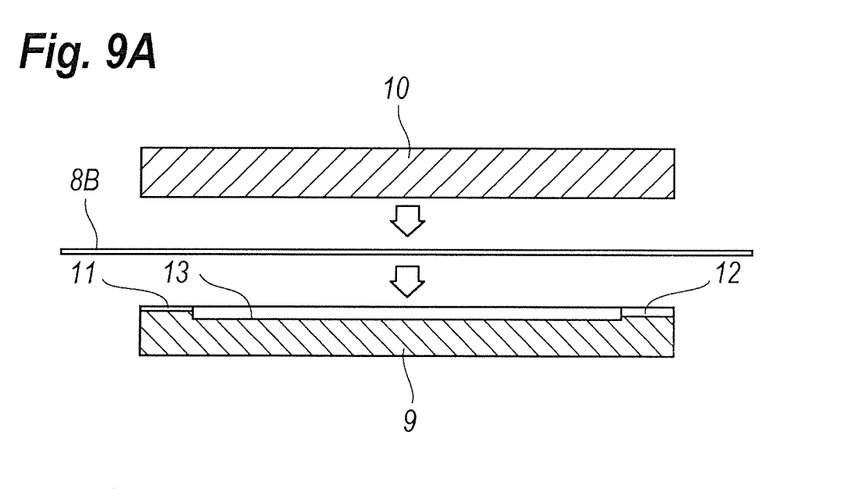
FIGS. 9A and 9B show process to set the fibers into respective grooves and to secure the fibers in the grooves by the cover 10.
Figure 9B:
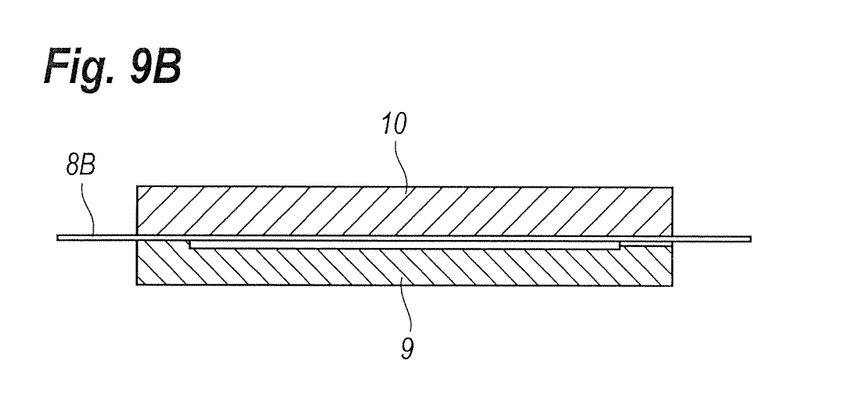

Assembling the optical fibers, 8A to 8C, on the alignment substrate 9, the optical fibers, 8A to 8C, are temporarily set in one end thereof into respective grooves, 11, concurrently with collecting all fibers and setting them into the other groove 12, which is shown in FIG. 9A Filling the grooves, 11 and 12, with resin, which is optically or thermally curable, and placing a cover 10 thereon; then, the resin is cured by, for instance, ultraviolet rays and/or keeping them under a relatively high temperature ambient (FIG. 9B).

After fixing the optical fibers, 8A to 8C, the process may cut the ends of the optical fiber exposing from the alignment substrate 9 and polish the cut surface. In an alternative, a glass slab made of resin for matching the refractive index with that of the optical fibers, 8A to 8C, may suppress the scattering of the light by attaching it in the cut surface of the optical fibers, 8A to 8C.

The cover 10 is preferably made of material transparent for light attributed to the LDs, 5A to 5C, but not restricted to those materials. An opaque cover is also applicable to the present embodiment.

Figure 10:
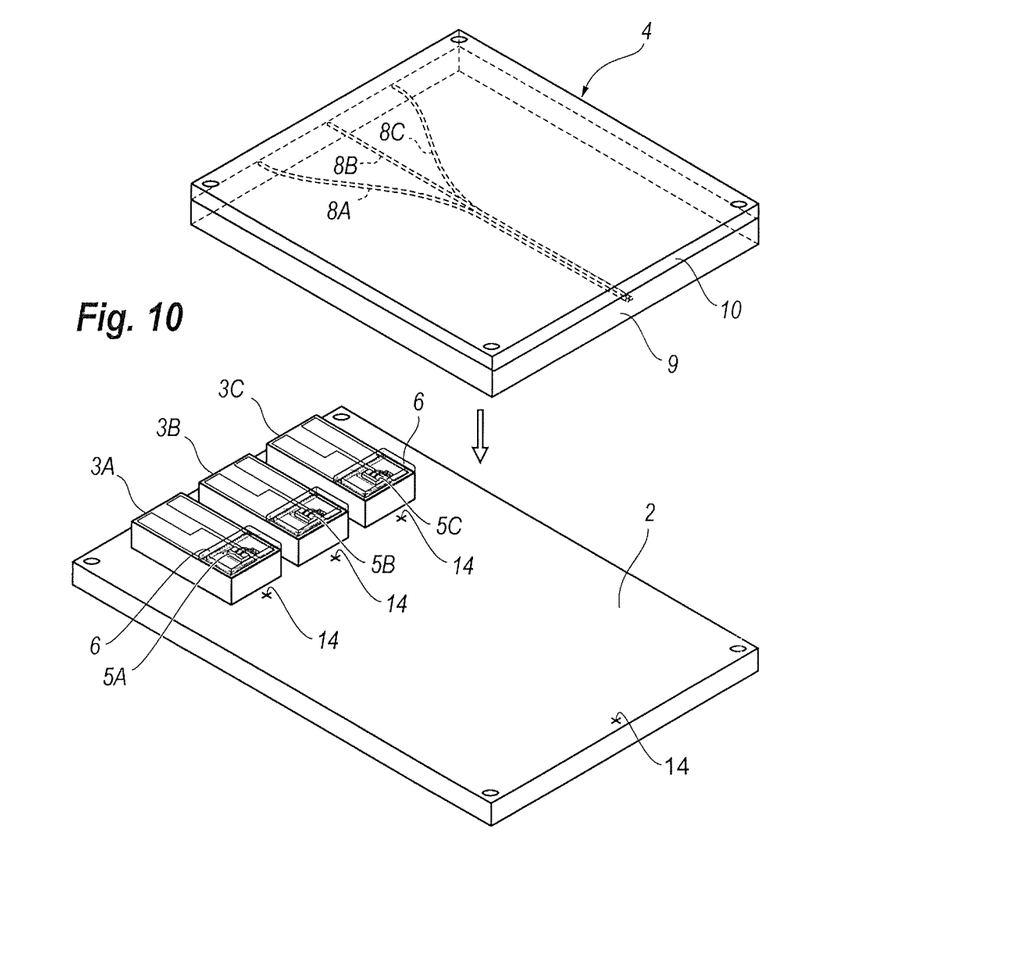
FIG. 10 show a process to mount the alignment substrate on the base.

When the holder 4 is transparent, the base 2 may easily mount the holder 4 in a preset position by preparing alignment marks 14 on the surface of the base 2 and align the holder 4 with respect to the alignment mark 12, as shown in FIG. 10. The alignment mark 14 may have a length of about 0.5 mm and a width of 0.02 mm in the present embodiment.

Moreover, the alignment substrate 9 may have a resin on a surface thereof to suppress stray light leaked therefrom. The stray light, which is scattered at the optical interface between the LDs, 5A to 5C, and the optical fibers, 8A to 8C, and/or within the optical fibers, may degrade the optical signal.

Referring back to FIG. 1 again, the collected fibers, 8A to 8C, couple with a single optical fiber 15 at the end of the alignment substrate 9. This single fiber 15 may have a core diameter of 187.1 µm for case where the fibers, 8A to 8C, has the core and cladding diameters of 74 and 80 µm, respectively, which may reduce the optical coupling loss therebetween effectively. The single fiber 15 couples optically with a lens 16 to reshape the field pattern of the mixed light; that is, the lens may concentrate or collimate the mixed light output from the single fiber 15. Because the light emitting from LDs, 5A to 5C, has a color of red, green, and blue, respectively; the light output from the single fiber 15, or the lens 16 becomes substantially white by merging those three colors. The lens 16 may be an achromatic lens to cancel the chromatic aberration, which makes the light passing the lens 16 in a converged beam or a collimated beam.

Thus, the present embodiment assembles the sub-mounts, 3A to 3C, and the holder 4 on the common base 2, where the sub-mounts, 3A to 3C, mount the LDs, 5A to 5C; while, the holder 4 supports the optical fibers, 8A to 8C, within the grooves 12 to couple the fibers optically with respective LDs, 5A to 5C, while the fibers, 8A to 8C, are collected in the other groove 13. This arrangement may easily mix the light emitted from respective LDs, 5A to 5C, as maintaining a substantial optical coupling.

Moreover, the present embodiment may omit any lenses that collimate light emitted from respective LDs, 5A to 5C, which makes it unnecessary to align optically between the LDs, 5A to 5C, and the lens. Thus, the optical device 1 may be compact and low-cost. Moreover, the optical device has a feature that the mixed light output from the lens 16 may easily and cost-effectively convert the field pattern thereof because the optical device 1 inherently shows a large tolerance for the assembly of the components thereof.

Second Embodiment

Figure 11:
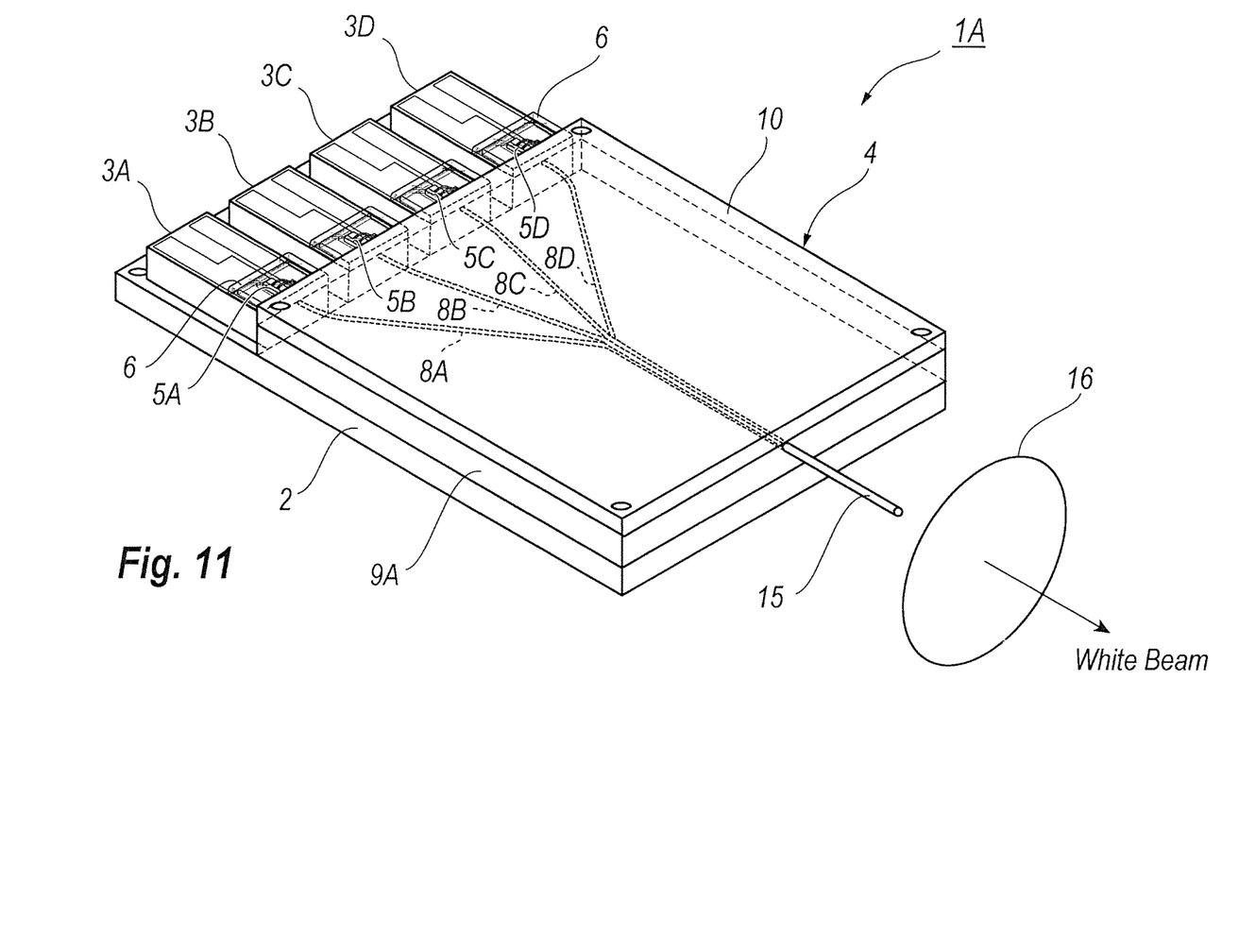
FIG. 11 is a perspective view showing an optical device according to the second embodiment of the invention.

FIG. 11 is a perspective view of an optical device 1A according to the second embodiment of the invention. The optical device 1A shown in FIG. 11 also includes the base 2 and the sub-mounts, 3A to 3D. In the present embodiment, two sub-mounts, 3A and 3D, each mounts the LDs, 5A and 5D, that emit green light; while, the sub-mount 3B mounts the LD 5B for emitting blue light, and the sub-mount 5C mounts the LD 5C for emitting red light.

Figure 12:
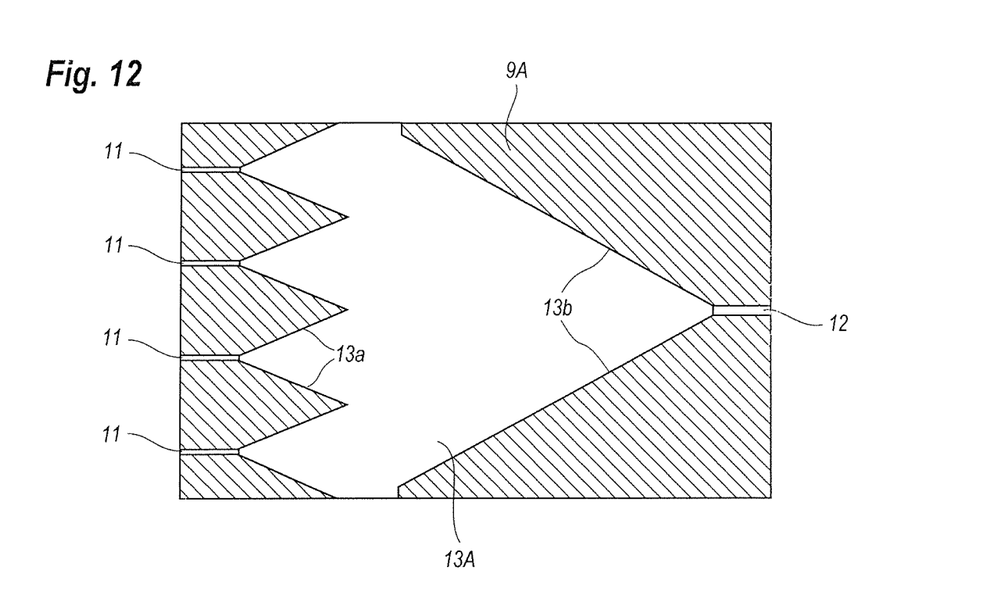
FIG. 12 is a plan view of the alignment substrate according to the second embodiment of the invention shown in FIG. 11.
Figure 13:
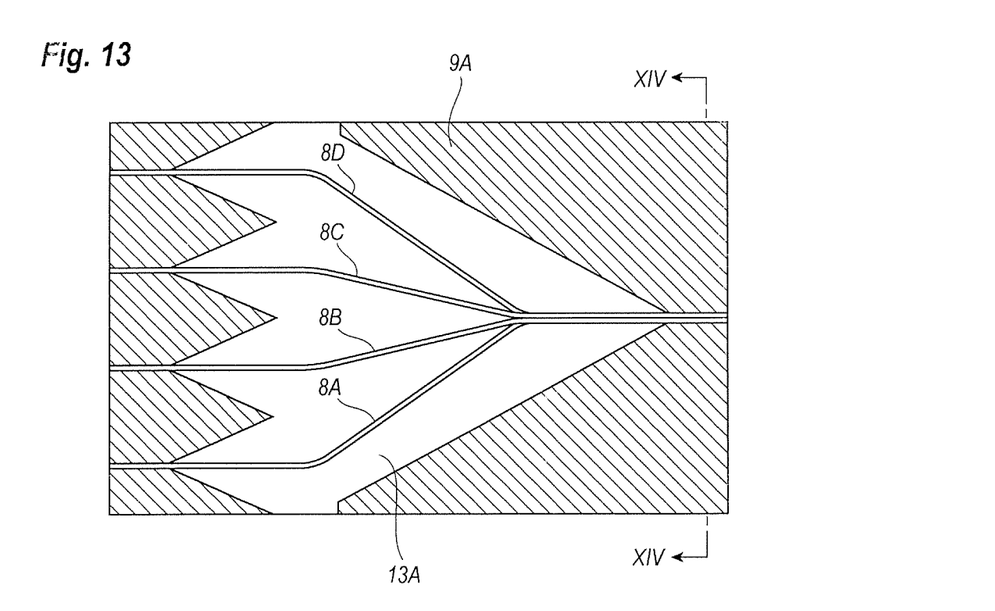
FIG. 13 is a plan view of the alignment substrate shown in FIG. 12, where the grooves therein receive respective fibers individually and collectively.

As illustrated in FIGS. 12 and 13, the alignment substrate 9A of the present embodiment includes four grooves 11 each receiving an optical fiber, 8A to 8D, optically coupled with respective LDs, 5A to 5D. Another groove 12 is formed in the other side of the alignment substrate 9, where, four fibers, 8A to 8D, are collectively set therein. These grooves, 11 and 12, have a square cross section as those of the former embodiment. Moreover, the hollow 13A of the present embodiment has a specific feature that respective grooves, 11 and 12, accompany with a pair of slant side walls, 13a and 13b. That is, the hollow 13A expands from the end of the groove 11 by the slant side walls 13a, while, from the end of the groove 12 by the slant side walls 13b. Thus, the edge of the grooves, 11 and 12, make obtuse angle against the slant side walls, 13a and 13b, which is preferable for the fibers, 8A to 8D, to be damaged at the corner between the grooves, 11 and 12, and the side wall of the hollow 13A.

Figure 14:
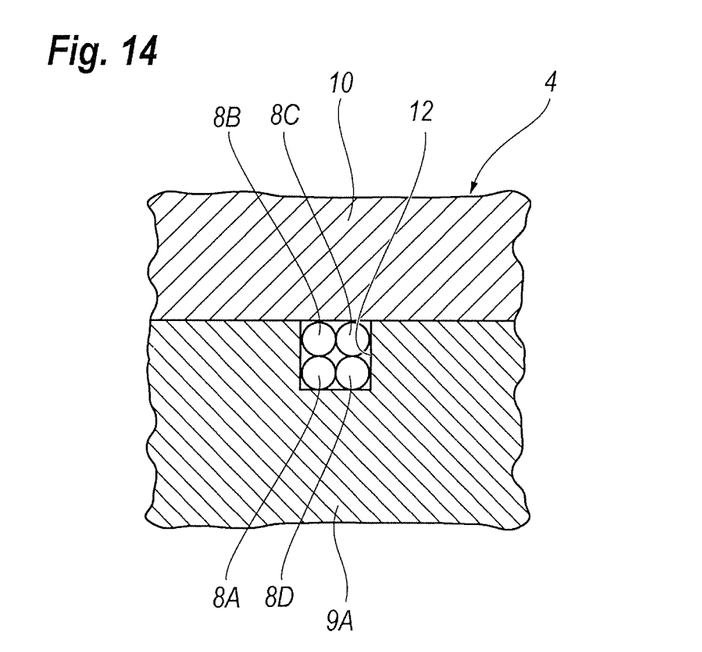
FIG. 14 is a cross section of the groove where the fibers are collectively set therein, which is taken along the line XIV-XIV indicated in FIG. 13.

The fibers, 8A to 8D, are collected in the groove 12 so as to come the cladding thereof in contact to that of other fibers, as shown in FIG. 14. Because of the arrangement where the cladding of respective fibers come in directly contact to the others, the light propagating in respective fibers, 8A to 8D, may be effectively mixed.

Thus, even the optical device 1 increases the count of the LD and the optical fiber coupled with the newly installed LD, the function to mix light may be easily carried out only by replacing the alignment substrate 9.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein.

For instance, the manufacturing process of the optical device 1 explained above may prepare one alignment substrate 9 independently; but the process may mass-produce the alignment substrate 9. Specifically, the manufacturing process prepares an original substrate for the alignment substrate, where the original substrate has a relatively wider area. Then, the process forms a plurality of grooves by dicing, sets optical fibers within respective grooves, places the cover on the original substrate, and fixes the cover thereto. Finally, the process divides the original substrate into respective alignment substrates in which fibers are already prepared in respective grooves.

Figure 15:
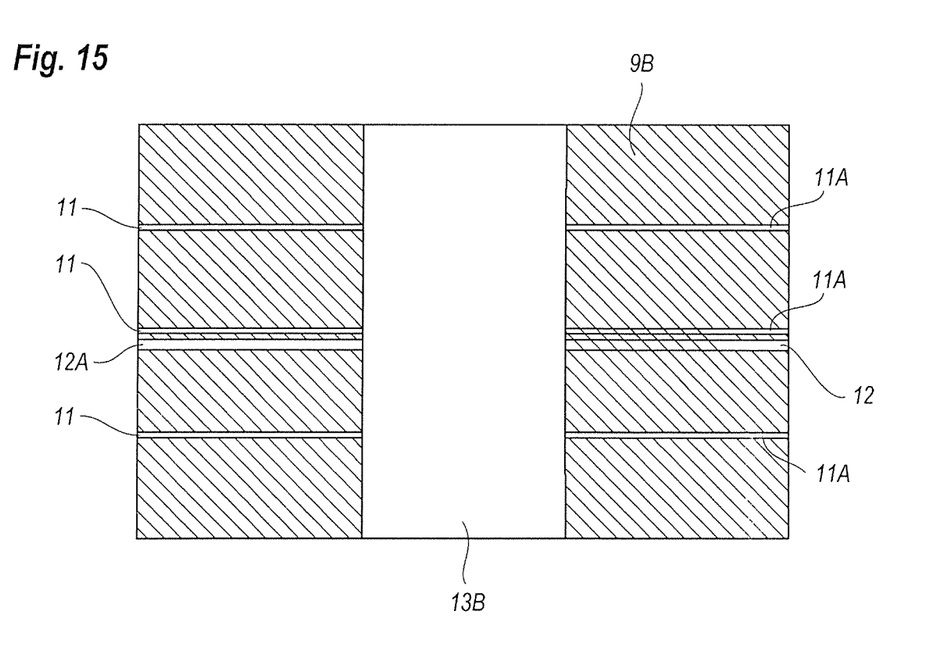
FIG. 15 is a plan view of the alignment substrate which is modified from that shown in FIG. 5 for the purpose of the mass-production.
Figure 16:
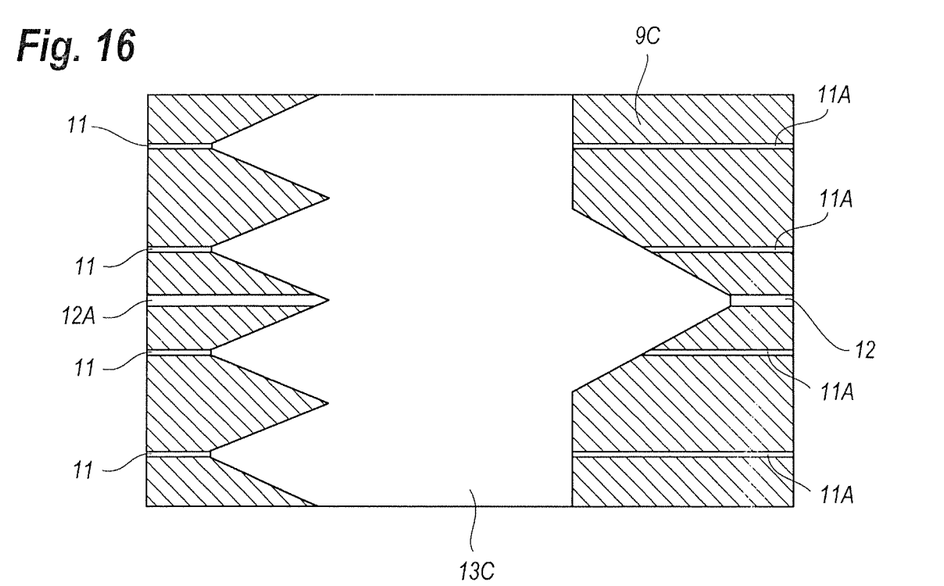
FIG. 16 is a plan view of the alignment substrate modified from that shown in FIG. 12 for the purpose of the mass-production.

FIGS. 15 and 16 show examples of the alignment substrate, 9B and 9C, described above. FIG. 15 illustrates an alignment substrate 9B with three grooves 11, while, FIG. 16 shows another alignment substrate 9C with four grooves 11. The alignment substrates, 9B and 9C, shown in FIGS. 15 and 16 have surplus grooves, 11A and 12A, not practically used in the optical device 1. The surplus grooves 11A appears in a side where the groove 12 is formed, while, another surplus grooves 12A appears in the side where the groove 11 is formed.

Figure 17A:
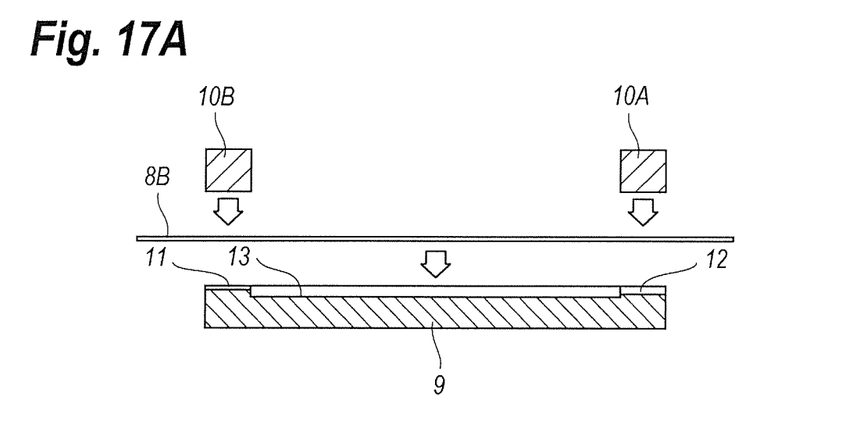
FIGS. 17A and 17B show process to set the fibers within the grooves, and to secure the fibers by the cover according to a modified embodiment of the invention.
Figure 17B:
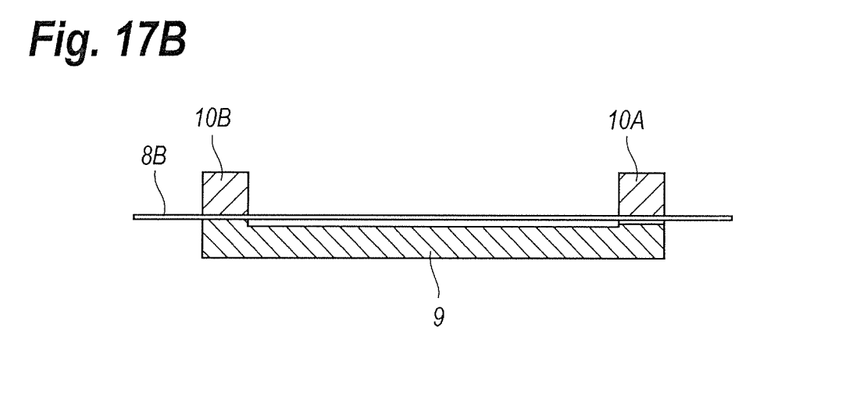
Figure 18A:
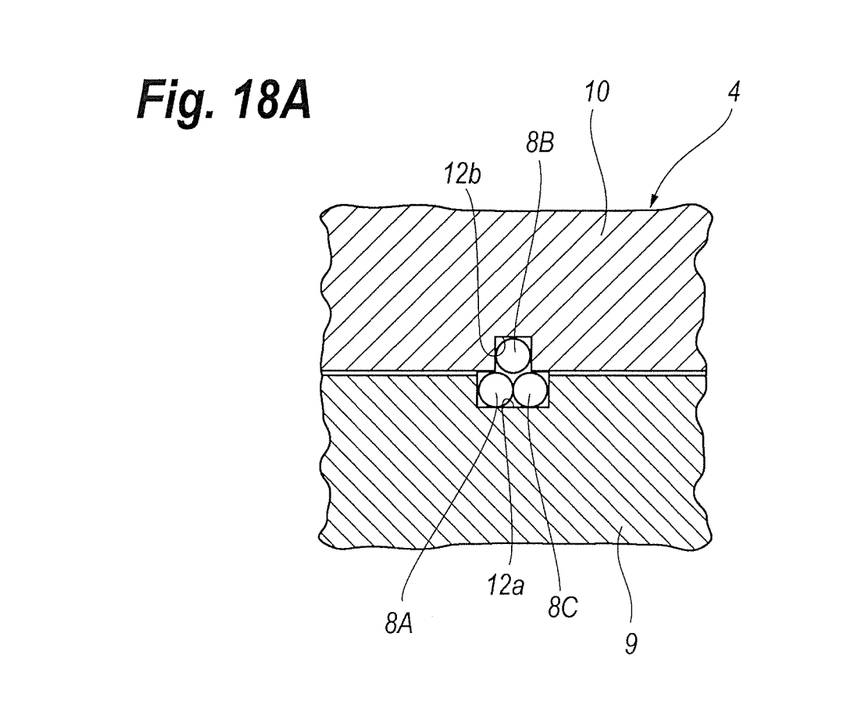
FIGS. 18A and 18B are cross section of the groove where the fibers are collectively set therein according to the modified embodiment of the alignment substrate and the cover.
Figure 18B:
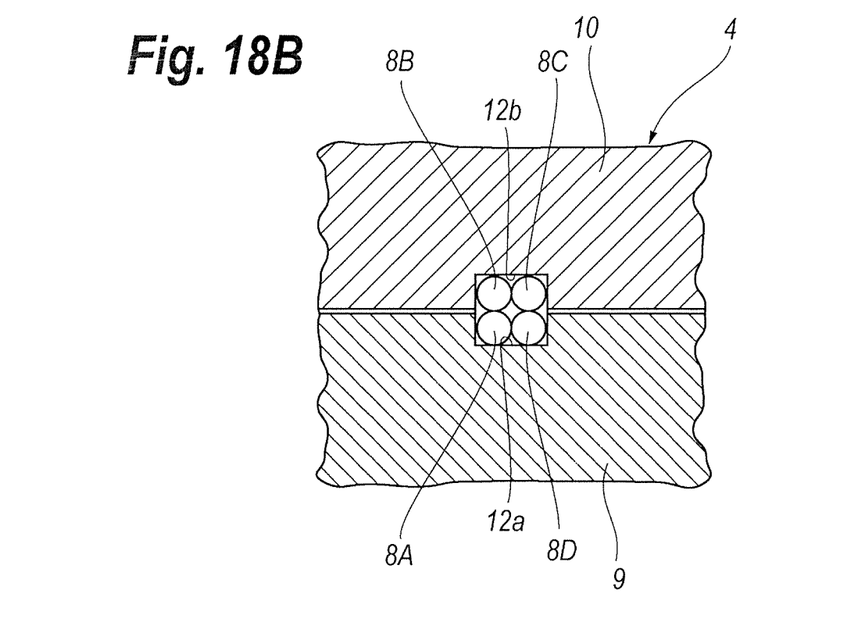

In still another modification of the present invention, aforementioned embodiments provides one cover 10 to set the fibers, 8A to 8D, in the grooves, 11 and 12. However, the invention is not restricted to such arrangement of the cover, the device 1 may implement with two covers, 10A and 10B, for covering the grooves 11 and the other grove 12, respectively, as illustrated in FIGS. 17A and 17B. The cover 10A sets the individual fibers, 8A to 8C, within respective grooves 11; while, the cover 10B sets the collected fibers, 8A to 8C, within the single groove 12. The hollow 13 between grooves, 11 and 12, is opened.

The embodiment above described includes the groove 12, into which the collected fibers, 8A to 8C, is set, only in the alignment substrate 9 as illustrated in FIG. 8 or 14. However, the optical device 1 may include the groove 12a in the alignment substrate 9 and another groove 12b in the cover 10. Some of fibers are set within the groove 12a, while, rest of the fibers are set within the groove 12b. Then, the cover 10 may be affixed to the alignment substrate 9.

In an alternative, the aforementioned embodiments provide the alignment substrate 9 where two types of grooves, 11 and 12, are formed. However, the invention may divide the alignment substrate 9. Specifically, one of alignment substrates has a plurality of grooves 11 that receives a single fiber individually; while, another alignment substrate has a single groove 12 into which the fibers are collectively set. Then, two alignment substrates are mounted on the base 2.

In still another alternative, the embodiments described above has an arrangement that one sub-mount, 3A to 3C, mounts an LD, 5A to 5C, individually. However, the invention may have single sub-mount on which all LDs are mounted. Even in this arrangement, the light emitted from respective LDs is guided to the individual fibers, and these fibers are collected in the one groove 12 formed in the alignment substrate 9 and finally propagated within a single fiber.

Therefore, it is intended that the present invention not be limited to the particular embodiments disclosed, but that the invention include all embodiments falling within the scope of the appended claims.

What is claimed is:

1. An optical device, comprising:
   a plurality of LDs each emitting light with a specific color, each of said LDs being mounted on a corresponding sub-mount of a plurality of sub-mounts;
   a plurality of fibers each propagating said light individually;
   a substrate including a first alignment substrate and a second alignment substrate, said first alignment substrate provided with a first type of grooves, each of said first type of grooves setting one of fibers therein individually, said second alignment substrate provided with a second type of groove setting said fibers collectively therein; and
   a base with said sub-mounts, said first alignment substrate and said second alignment substrate mounted thereto,
   wherein said first alignment substrate and said second alignment substrate define a hollow therebetween, said fibers extending unrestrained and wiggly within in said hollow.

2. The optical device of claim 1,
   wherein said fibers are in contact to each other in said second type of said groove.

3. The optical device of claim 1,
   wherein said fibers are closely collected in said second type of said groove.

4. The optical device of claim 1,
   wherein said hollow has a depth greater than a depth of said first type of said grooves and a depth of said second type of said groove.

5. The optical device of claim 4,
   wherein said hollow has side walls each continuous to one of said first type of said grooves,
   wherein said side walls expand from said one of said first type of said groove toward said second type of said grooves.

6. The optical device of claim 4,
   wherein said hollow has side walls each continuous to said second type of said groove,
   wherein said side walls expand from said second type of said groove toward said first type of said grooves.

7. The optical device of claim 1,
   further including a cover for covering said substrate, said fibers set within said first type of said grooves and said second type of said groove being covered by said cover.

8. The optical device of claim 7,
   wherein said cover includes a first cover and a second cover, said first cover covering said first type of said grooves and said second cover covering said second type of said groove.

9. The optical device of claim 1,
   wherein each of said fibers is set within one of said first type of said grooves with a resin.

10. The optical device of claim 1,
    wherein said fibers are set within said second type of said groove with a resin.

11. The optical device of claim 1,
    wherein said specific color is one of red, blue, and green.

12. The optical device of claim 1,
    further including an additional fiber having a core diameter greater than a core diameter of said fibers,
    wherein said additional fiber optically couples with said fibers set within said second type of said groove and emits white light.

* * * * *